United States Patent
Culler

(10) Patent No.: US 11,794,197 B1
(45) Date of Patent: Oct. 24, 2023

(54) SYSTEM AND METHOD FOR WASTEWATER TREATMENT

(71) Applicant: Paul L. Culler, Stuart, FL (US)

(72) Inventor: Paul L. Culler, Stuart, FL (US)

(*) Notice: Subject to any disclaimer, the term of this patent is extended or adjusted under 35 U.S.C. 154(b) by 0 days.

(21) Appl. No.: 18/132,181

(22) Filed: Apr. 7, 2023

(51) Int. Cl.
| | |
|---|---|
| *B04C 5/103* | (2006.01) |
| *B01D 21/26* | (2006.01) |
| *B04C 3/06* | (2006.01) |
| *B04C 5/13* | (2006.01) |
| *C02F 9/00* | (2023.01) |
| *C02F 1/32* | (2023.01) |
| *C02F 1/38* | (2023.01) |
| *C02F 1/44* | (2023.01) |
| *C02F 1/50* | (2023.01) |
| *C02F 1/52* | (2023.01) |
| *C02F 1/56* | (2023.01) |

(52) U.S. Cl.
CPC ............. *B04C 5/103* (2013.01); *B01D 21/26* (2013.01); *B01D 21/265* (2013.01); *B04C 3/06* (2013.01); *B04C 5/13* (2013.01); *C02F 9/00* (2013.01); *C02F 1/32* (2013.01); *C02F 1/38* (2013.01); *C02F 1/441* (2013.01); *C02F 1/444* (2013.01); *C02F 1/50* (2013.01); *C02F 1/5236* (2013.01); *C02F 1/56* (2013.01); *C02F 2303/04* (2013.01)

(58) Field of Classification Search
None
See application file for complete search history.

(56) References Cited

U.S. PATENT DOCUMENTS

| | | | |
|---|---|---|---|
| 5,084,189 A * | 1/1992 | Richter | ................. F04D 29/406 95/266 |
| 8,062,522 B1 | 11/2011 | Culler | |
| 8,066,887 B1 | 11/2011 | Culler | |
| 8,101,078 B1 | 1/2012 | Culler | |
| 8,142,656 B1 | 3/2012 | Culler | |
| 8,425,782 B2 | 4/2013 | Culler | |
| 9,487,425 B1 | 11/2016 | Culler | |
| 9,512,022 B1 * | 12/2016 | Culler | ....................... C02F 9/00 |
| 9,512,023 B1 | 12/2016 | Culler | |
| 9,527,014 B1 | 12/2016 | Culler | |
| 9,611,162 B1 | 4/2017 | Culler | |
| 10,173,910 B2 | 1/2019 | Culler | |
| 11,008,227 B2 | 5/2021 | Worley et al. | |
| 11,084,737 B1 | 8/2021 | Contreras et al. | |
| 2008/0314807 A1 * | 12/2008 | Junghanns | ........... B01D 61/025 210/85 |
| 2014/0311970 A1 * | 10/2014 | Theodoulou | .............. C02F 3/30 210/402 |
| 2018/0290082 A1 * | 10/2018 | Koski | ..................... C02F 1/004 |

* cited by examiner

*Primary Examiner* — Clare M Perrin
(74) *Attorney, Agent, or Firm* — Connelly Law PLLC; William J. Connelly, III

(57) ABSTRACT

A low-density suspended solid separation apparatus and method is disclosed. The apparatus comprises a separation tube adapted to receive pre-filtered wastewater and a vortex generator rotated to create a vortex in the separation tube such that the vortex separates low-density suspended solids having a density less than one (1) from the pre-filtered wastewater when the pre-filtered wastewater is passed through the vortex generator. An adjustable tube is inserted from the opposite end of the separation tube into the vortex wherein air inside the adjustable tube is at a pressure less than that of the separation tube causing the low density suspended solids to be removed from the vortex. Remaining water is then discharged from the separation tube.

20 Claims, 3 Drawing Sheets

SYSTEM AND METHOD FOR WASTEWATER TREATMENT

BACKGROUND

FIELD OF INVENTION

Embodiments of the present invention generally relate to water treatment systems and particularly to a system and method for wastewater treatment that removes low-density suspended solids from wastewater.

DESCRIPTION OF RELATED ART

Wastewater comprises any used water or domestic water that is obtained from sinks, industries, showers, disposals, and so forth. Discharge of the wastewater can give rise to various environmental concerns such as destruction of natural habitats, water related diseases, and so forth. Therefore, in order to protect the environment and general population, wastewater treatment is required. More specifically, removal of suspended solids from wastewater plays an essential role in addressing these environmental and ecological concerns.

Traditionally, the sedimentation process requires the removal of the suspended solids from the wastewater. However, the sedimentation process often requires a number of complex steps and sophisticated equipment and thus, the technique of removing small, suspended solids in an efficient manner is often very poor and difficult to accomplish. Further, various apparatus such as, tube settlers, swirl separators, and so forth have been designed for removing the suspended solids from the wastewater. While a majority of the procedures known in the art are capable of removing high-density suspended solids from the wastewater, many of the known apparatus do not remove lower density suspended solids in an efficient manner. In most instances, procedures known in the art are only able to remove a fraction of low-density suspended solids, thereby bring about the need for a more efficient apparatus and method to accomplish the removal of low-density suspended solids.

There is thus a need for an improved and advanced system and method that removes low density suspended solids from wastewater in a more efficient manner.

SUMMARY

Embodiments in accordance with the present invention provide a system for wastewater treatment. The system comprises a pre-filtration unit adapted to pre-filter raw wastewater by removing one or more large particulates from the raw wastewater. The system further comprises a mass flow meter adapted to determine an amount of one or more polymers and air to be mixed with the pre-filtered wastewater. Suspended solids often refers to small solid particles which remain in suspension in water as a colloid or due to motion of the water. The term suspended solids are used as an indicator of water quality and strength of sewage or wastewater in general. Suspended solids are important as pollutants and pathogens are carried on the surface of particles.

The system further comprises a low-density suspended solid separation apparatus. The apparatus comprises a separation tube having a first pre-defined pressure and adapted to receive the pre-filtered wastewater through a first inlet positioned at a first end of the separation tube. The apparatus further comprises a vortex generator located within the separation tube. The vortex generator is rotated to create a vortex in the separation tube such that the vortex separates low-density suspended solids having a density less than one (1) from the pre-filtered wastewater when the pre-filtered wastewater is passed through the vortex generator. More specifically, when the vortex is created by the vortex generator any low density suspended solids having a density less than one will remain in the center of the vortex. The term low density suspended solids having a density less than one (1) refers to low density suspended solids having density less than one gram per cubic centimeter ($g/cm^3$). In an embodiment of the present invention, the low density suspended solids may comprise a mixture of particulate, air, polymer and/or coagulant wherein the mixture has a density less than one (1). The apparatus further comprises an adjustable tube inserted to a desired length into the vortex from a first outlet of a second end of the separation tube. The adjustable tube having a second pre-defined pressure lesser than the first pre-defined pressure of the separation tube such that a negative pressure created in the adjustable tube causes the low density suspended solids, air and the one or more polymers to be removed from the separation tube. The apparatus further comprises a second outlet positioned at the second end of the separation tube and adapted to remove the remaining water. The system further comprises a first post-filtration unit comprising ultra-filtration membrane adapted to receive the remaining water from the apparatus to remove any additional remaining minute particulate matter. In another embodiment of the present invention, if necessary, the system further comprises a second post filtration unit comprising a reverse osmosis membrane filter. In an embodiment of the present invention, the membrane filter of the second post filtration unit is a reverse osmosis membrane. In a preferred embodiment of the present invention, a second post filtration unit is necessary should a user wish to produce indirect potable water. The system further comprises a disinfection process wherein filtered water from either the first or second post-filtration unit is treated with a bacteriostatic and ultraviolet radiation (UV) to eliminate one or more microorganisms. In another embodiment of the present invention, disinfection comprises the addition of a bactericidal. In yet another embodiment of the present invention, disinfection comprises the addition of a bactericidal and ultraviolet radiation (UV).

Embodiments in accordance with the present invention further provide a low-density suspended solid separation apparatus. The apparatus comprises a separation tube having a first pre-defined pressure and adapted to receive pre-filtered wastewater through a first inlet positioned at a first end of the separation tube. The apparatus further comprises a vortex generator located within the separation tube. The vortex generator is rotated to create a vortex in the separation tube such that the vortex separates low-density suspended solids having a density less than one (1) from the pre-filtered wastewater when the pre-filtered wastewater is passed through the vortex generator. The apparatus further comprises an adjustable tube inserted to a desired length into the vortex from a first outlet of a second end of the separation tube. The adjustable tube having a second pre-defined pressure lesser than the first pre-defined pressure of the separation tube such that a negative pressure created in the adjustable tube causes the low density suspended solids, air and one or more polymers to be removed from the separation tube. The apparatus further comprises a second outlet positioned at the second end of the separation tube and adapted to remove remaining water containing any remaining suspended solids from the separation tube.

Embodiments in accordance with the present invention further provide a method for treating wastewater. The method comprising steps of: passing raw wastewater through a prefiltration unit for removing one or more large particulates; adding a coagulate to the prefiltered wastewater, determining, by a mass flow meter, an amount of one or more polymers and air to be mixed with the pre-filtered wastewater; receiving the pre-filtered wastewater by a separation tube of an apparatus through a first inlet positioned at a first end of the separation tube; passing the prefiltered wastewater through a vortex generator such that vortex generator is rotated to create a vortex in the separation tube for separating low-density suspended solids having a density less than one (1) from the pre-filtered wastewater; inserting an adjustable tube into the vortex from a first outlet of a second end of the separation tube such that a negative pressure in the adjustable and movable tube causes the low density suspended solids comprising a mixture of particulate, air, polymer and/or coagulant to be removed from the separation tube; removing the remaining water from the separation tube through a second outlet of the apparatus; passing the remaining water through a first post-filtration unit comprising an ultra-filtration membrane for removing additional minute particulate matter; and treating the remaining water with a disinfectant comprising a bacteriostatic and ultraviolet radiation for eliminating one or more microorganisms. If indirect potable water is desired, prior to disinfection, the remaining water may be passed through a second post filtration unit comprising a reverse osmosis membrane filter.

Embodiments of the present invention may provide a number of advantages depending on its particular configuration. First, embodiments of the present application may provide a system and a method for wastewater treatment. Next, embodiments of the present application may provide a system that is provided with an apparatus designed to remove suspended solids with a density less than one.

Next, embodiments of the present application may provide an apparatus that involves an addition of negative pressure to remove low density suspended solids having a density less than one (1) from a vortex.

Next, embodiments of the present application may provide a system that treats wastewater by allowing the wastewater to undergo one or more treatments such as, pre-filtering of the wastewater, removing low-density suspended solids from the wastewater, post-filtering of the wastewater, disinfecting the wastewater, and so forth.

These and other advantages will be apparent from the present application of the embodiments described herein.

The preceding is a simplified summary to provide an understanding of some embodiments of the present invention. This summary is neither an extensive nor exhaustive overview of thepresent invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein.

Figure 1A:
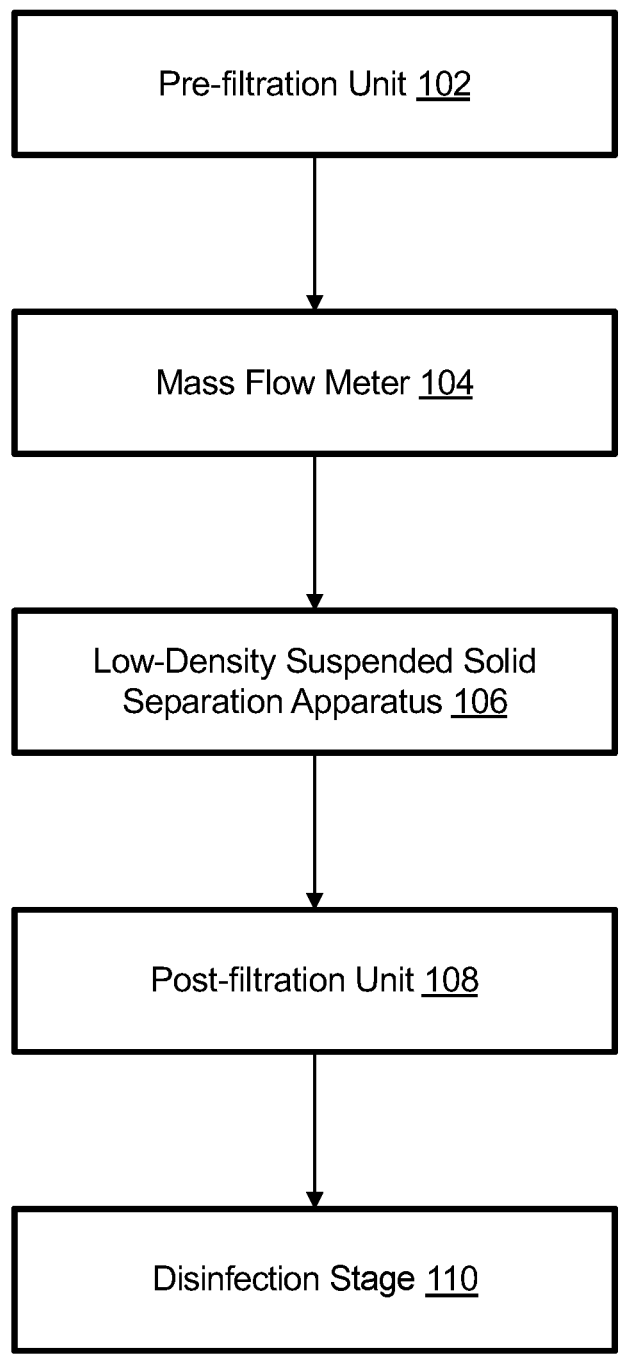
FIG. 1A illustrates a block diagram depicting a system for wastewater treatment, according to an embodiment of the present invention.

While embodiments of the present invention are described herein by way of example using several illustrative drawings, those skilled in the art will recognize the present invention is not limited to the embodiments or drawings described. It should be understood the drawings and the detailed description thereto are not intended to limit the present invention to the particular form disclosed, but to the contrary, the present invention is to cover all modifications, equivalents and alternatives falling within the spirit and scope of embodiments of the present invention as defined by the appended claims.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The terms "determine", "calculate" and "compute," and variations thereof, as used herein, are used interchangeably and include any type of methodology, process, mathematical operation or technique.

FIG. 1A illustrates a block diagram depicting a system 100 for wastewater treatment, according to an embodiment of the present invention. According to embodiments of the present invention, the system 100 may be configured to treat wastewater by allowing the wastewater to undergo one or more treatments (hereinafter referred to as the treatments) such as, but not limited to, pre-filtering of the wastewater, removing one or more low-density suspended solids from the wastewater, post-filtering of the wastewater, disinfecting the wastewater, and so forth. Embodiments of the present invention are intended to include or otherwise cover any type of the treatments including known related art and/or later developed technologies.

According to embodiments of the present invention, the system 100 may comprise a pre-filtration unit 102, a mass flow meter 104, a low-density suspended solid separation apparatus 106 (hereinafter referred to as the apparatus 106), a post-filtration unit 108, and a disinfection step 110. In additional embodiments of the present invention, an additional second post filtration step (not shown) may be incorporated.

According to embodiments of the present invention, the pre-filtration unit 102 may be adapted to pre-filter raw wastewater from domestic, industrial, agricultural or stormwater sources for removing one or more large particulates (hereinafter referred to as the large particulates) from the raw wastewater. The large particulates may be, but not limited to, human and/or animal metabolic waste, sand, rock, silt, and so forth, in an embodiment of the present invention. Embodiments of the present invention are intended to include or otherwise cover any type of the large particulates including known related art and/or later developed technologies. The pre-filtration unit 102 may be, but not limited to, an activated carbon filter, spongy materials, statically charged collection grids, and so forth. In a preferred embodiment of the present invention, the pre-filtration unit 102 may be a screen filter. As used herein, the term "screen filter" refers to a type of a filtration of water that uses a rigid or flexible screen to separate the large particulates from the wastewater. Embodiments of the present invention are intended to include or otherwise cover any type of the pre-filtration unit 102 including known related art and/or later developed technologies.

Further, in an embodiment of the present invention, one or more coagulates (hereinafter referred to as the coagulates) may be added to the pre-filtered wastewater for destabilizing one or more unsettled or slow-settling tiny particles in the pre-filtered wastewater. The coagulates may be, but not limited to, aluminum sulfate, sodium aluminate, ferric sulfate, and ferric chloride, and so forth, in an embodiment of the present invention. Embodiments of the present invention are intended to include or otherwise cover any type of the coagulates including known related art and/or later developed technologies.

The mass flow meter 104 may be adapted to receive the pre-filtered wastewater and further determines an amount of one or more polymers (hereinafter collectively referred to as the polymers and individually referred to as the polymer) and air to be added to the pre-filtered wastewater. In an embodiment of the present invention, the polymer may be added to the pre-filtered wastewater for attracting all fine particles that may be suspended in the wastewater to form larger groups, leaving behind clear water. The polymer may be, but not limited to, polyacrylamide, and so forth, in an embodiment of the present invention. Embodiments of the present invention are intended to include or otherwise cover any type of the polymer including known related art and/or later developed technologies. Further, in an embodiment of the present invention, the mass flow meter 104 may be detachably connected to the pre-filtration unit 102. In another embodiment of the present invention, the mass flow meter 104 may be fixedly connected to the pre-filtration unit 102. In an embodiment of the present invention, the system 100 may comprise a mixer (not shown) that may be capable to mix the determined amount of polymer along with air to the pre-filtered wastewater.

In an embodiment of the present invention, the apparatus 106 may be designed to receive the pre-filtered wastewater and separate the low-density suspended solids having a density of less than one (1) from the wastewater. In a preferred embodiment of the present invention, the low-density suspended solids are those suspended solids with a density less than one (1). In an embodiment of the present invention, the low density suspended solids may comprise a mixture of particulate, air, polymer and/or coagulant wherein the mixture has a density less than one (1). Further, the separated low-density suspended solids may be removed from the apparatus 106 and enable remaining water containing additional solids and or minute particulate matter to undergo additional treatments. Further, in an embodiment of the present invention, the apparatus 106 may be detachably connected to the mass flow meter 104. In another embodiment of the present invention, the apparatus 106 may be fixedly connected to the mass flow meter 104. In another embodiment of the present invention, the apparatus 106 is detachably attached to a prefiltered water source.

In an embodiment of the present invention, the post-filtration, interchangeably referred to as a "first post filtration unit" unit 108 may be adapted to receive the remaining water from the apparatus 106 for removal of additional minute particulate matter from the remaining water. The post-filtration unit 108 may be, but not limited to, ultra-filtration membranes, activated carbon filter, reverse osmosis, and so forth, in an embodiment of the present invention. In another embodiment of the present invention and to classify the remaining water as indirectly potable, an additional, second post filtration unit (not shown) may be incorporated following the post-filtration unit/first post-filtration unit 108 to remove remaining dissolved solids wherein the second post-filtration comprises a reverse osmosis membrane. In another embodiment of the present invention, the discharged remaining water may be indirectly potable such that the water may be reused to, but not limited to, wash vehicles, watering plants, and so forth. Embodiments of the present invention are intended to include or otherwise cover any type of the post-filtration unit 108 including known related art and/or later developed technologies. Further, in an embodiment of the present invention, the post-filtration unit 108 may be detachably connected to the apparatus 106. In another embodiment of the present invention, the post-filtration unit 108 may be fixedly connected to the apparatus 106.

In the disinfection stage 110 the remaining treated water from either the first post-filtration unit 108 or second post filtration unit (not shown) is treated with a bacteriostatic and ultraviolet radiation for eliminating one or more microorganisms from the filtered water. The microorganisms may be, for example, but not limited to, bacteria, viruses, protozoa, and so forth. In an additional embodiment of the present invention, the disinfection stage 110 may comprise Ultraviolet light (UV) where the filtered water may pass through UV radiations for inactivating the microorganisms. In another embodiment of the present invention, a chlorine may be used as the disinfectant for inactivating the microorganisms. In yet another embodiment of the present invention, the UV radiations as well as the chlorine may be used as the disinfectant. Embodiments of the present invention are intended to include or otherwise cover any type of the disinfectant including known related art and/or later developed technologies.

Figure 1B:
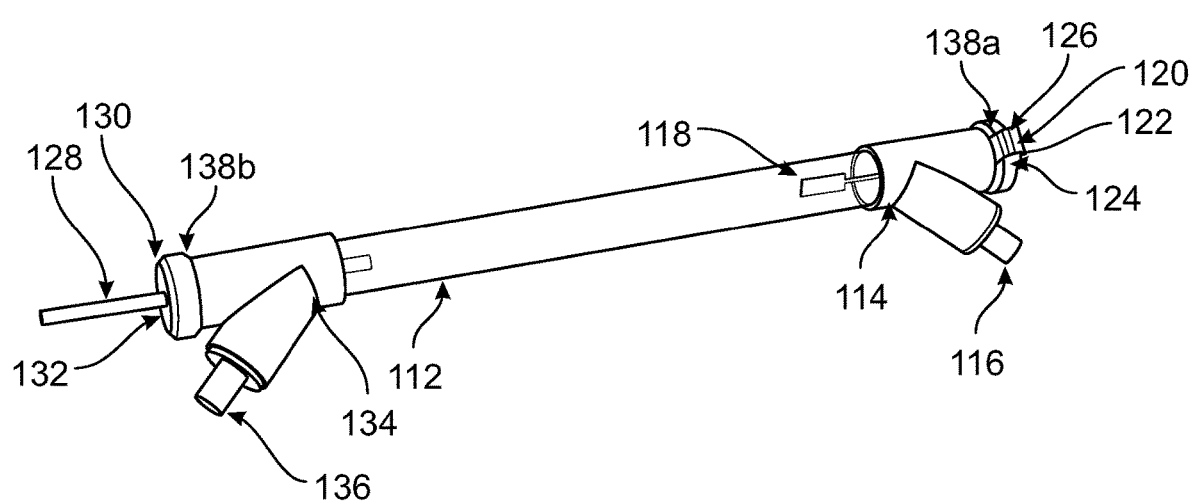
FIG. 1B illustrates a schematic representation of a low-density suspended solid separation apparatus, according to an embodiment of the present invention.

FIG. 1B illustrates a schematic representation of the apparatus 106, according to an embodiment of the present invention. According to embodiments of the present invention, the apparatus 106 may be used to separate the low-density suspended solids from the pre-filtered wastewater. The apparatus 106 may comprise a separation tube 112, in an embodiment of the present invention. In an embodiment of the present invention, the separation tube 112 may be circular in shape. In another embodiment of the present invention, the separation tube 112 may be cylindrical in shape. In such embodiment of the present invention, the separation tube 112 may be an enclosed elongated cylinder that may be capable to accommodate one or more components that may be utilized in separating the low-density suspended solids from the pre-filtered wastewater. Embodiments of the present invention are intended to include or otherwise cover any shape of the separation tube 112 including known related art and/or later developed technologies.

In an embodiment of the present invention, the separation tube 112 may have a first pre-defined pressure i.e. P1. Further, in an embodiment of the present invention, the separation tube 112 may be having a diameter (D1) in a range of 3.8 inches to 4.2 inches. In yet another embodiment of the present invention, the separation tube 112 may have a diameter (D1) of 4 inches. Further, in an embodiment of the present invention, the separation tube 112 may be a transparent tube. In an embodiment of the present invention, the separation tube 112 may be having a plurality of openings that may be adapted to remove the low-density suspended solids the wastewater passing through the separation tube 112.

The apparatus 106 may further comprise a first inlet 114 on a first end of the separation tube 112, in an embodiment of the present invention. In an embodiment of the present invention, the first inlet 114 is placed at a pre-defined angle on a first end of the separation tube 112. In an embodiment of the present invention, the separation tube 112 may be adapted to receive the pre-filtered wastewater through the first inlet 114 of the apparatus 106. In an embodiment of the present invention, the apparatus 106 may further comprise a first hose adapter 116 that may be attached to the first inlet 114 of the apparatus 106 for enabling an attachment of a hose appliance (not shown) to the first inlet 114 of the apparatus 106. In such embodiment of the present invention, the hose appliance may be attached to the first inlet 114 for pumping the pre-filtered wastewater into the separation tube 112. As used herein, the term "hose appliance" refers to a piece and/or part of equipment used with a hose for delivering the pre-filtered wastewater. The hose appliance may be, but not limited to, a hose, a tap, and so forth, in an embodiment of the present invention. Embodiments of the present invention are intended to include or otherwise cover any type of the hose appliance including known related art and/or later developed technologies that may be beneficial to deliver pre-filtered wastewater into the separation tube 112. In an embodiment of the present invention, a pumping arrangement (not shown) may be provided near the hose appliance for pumping the pre-filtered wastewater into the separation tube 112. In yet another embodiment of the present invention, the first hose adaptor 116 may accept various types of piping including but not limited to PVC, PEX, and copper.

Further, according to embodiments of the present invention, the apparatus 106 may comprise a vortex generator 118 that may be located within the separation tube 112. In an embodiment of the present invention, the vortex generator 118 may be usually located at a side of a second inlet 120 within the separation tube 112. In an embodiment of the present invention, the vortex generator 118 may be rotated to create a vortex in the separation tube 112. In such embodiment of the present invention, the rotation of the vortex generator 118 may create a centripetal force for creating the vortex in the separation tube 112. In an embodiment of the present invention, the vortex generator 118 may be positioned at any point on a rotary shaft 122 within the separation tube 112, as rotation of the vortex generator 118 may generate the vortex in the separation tube. In an embodiment of the invention, the speed of the vortex generator 118 will determine the strength of the vortex within the separation tube 112. In another embodiment of the present invention, the vortex generator 118 may generate a vortex that extends substantially through an entire length of the separation tube 112. In an embodiment of the present invention, the rotary shaft 122 may be operated by a motor. In another embodiment of the present invention, the rotary shaft 122 may be operated by a turbine that may be one of, a high-pressure turbine, a hydraulic turbine, and so forth. In an embodiment of the present invention, when the pre-filtered wastewater passes through the vortex created by the vortex generator 118, wherein through centripetal force the low-density suspended solids having a density less than one (1) of the pre-filtered wastewater may remain in a center of the vortex in the separation tube 112.

In an embodiment of the present invention, a strength of the vortex generator 118 may depend on a rotation per speed (rpm) of the vortex generator 118 and the suspended solids. In other words, the vortex generator 118 may be controllable for creating vortices of varying strengths, e.g., by increasing or reducing a speed of rotation of the vortex generator 118. In a preferred embodiment of the present invention, the vortex generator 118 may be an impeller. In an embodiment of the present invention, the impeller may be, but not limited to, a flat paddle impeller, a crossed blade type mixer for radial or tangential flow that minimizes axial flow generation, and so forth. Embodiments of the present invention are intended to include or otherwise cover any type of the impeller including known related art and/or later developed technologies.

Further, in an embodiment of the present invention, the apparatus 106 may comprise a rotary shaft seal 124 that may be housed between the rotary shaft 122 and a wall of the separation tube 112. The rotary shaft seal 124 may be housed to avoid leakage of the wastewater along the rotary shaft 122, in an embodiment of the present invention. In an embodiment of the present invention, the apparatus 106 may comprise a first VIC plug 126 that may be arranged at the second inlet 120 of the first end of the apparatus 106, to attain a hydraulic balance within the separation tube 112 by regulating flow and pressure of the wastewater. In an embodiment of the present invention, the first VIC plug 126 may be installed with a bushing (not shown) that may reduce a leakage of the first VIC plug 126.

The apparatus 106 may further comprise an adjustable tube 128 that may be inserted from a first outlet 130 of a second end of the separation tube 112, in an embodiment of the present invention. In such embodiment of the present invention, the adjustable tube 128 may be inserted to a desired length into the vortex in the separation tube 112 through the first outlet 130. In an embodiment of the present invention, the adjustable tube 128 may have a second pre-defined pressure i.e. P2 that is lesser than the first pre-defined pressure (P1) of the separation tube 112.

Due to a pressure difference between the first pre-defined pressure and the second pre-defined pressure (P1-P2) in the separation tube 112 and the adjustable tube 128, a negative pressure may be created inside the adjustable tube 128, in an embodiment of the present invention. The negative pressure may cause the low density suspended solids having density less than one gram per cubic centimeter ($g/cm^3$), comprising a mixture of particulate, air, polymers and/or coagulant to be removed and/or pulled out from the vortex created in the separation tube 112, in an embodiment of the present invention. As used herein, the term "negative pressure" refers to an area where a pressure is smaller in one place relative to another place. In an embodiment of the present invention, the negative pressure may be a vacuum. In an embodiment to the present invention, the first defined pressure of the separation tube (P1) is responsible for propelling the wastewater through the separation tube and to and through the second outlet 134 for discharging the remaining water from the apparatus 106.

In an embodiment of the present invention, the adjustable tube 128 may be made up of a material such as, but not limited to, stainless steel, carbon steel, aluminium, and so forth. Embodiments of the present invention are intended to include or otherwise cover any type of the material of the adjustable tube 128 including known related art and/or later developed technologies. In an embodiment of the present invention, a diameter (D2) of the adjustable tube 128 may be in a range of 0.8 inches to 1.2 inches. In another embodiment of the present invention, the diameter (D2) of the adjustable tube 128 may be 1 inch. In an embodiment of the present invention, the adjustable tube 128 may be connected to a flexible hose (not shown) to discharge the low density suspended solids from the adjustable tube 128.

In an embodiment of the present invention, the apparatus 106 may further comprise a second VIC plug 132 that may be arranged at the first outlet 130 of the second end of the separation tube 112 of the apparatus 106. The second VIC plug 132 may be a valve that may regulate flow and pressure of the low density suspended solids in the adjustable tube 128, in an embodiment of the present invention. In an embodiment of the present invention, the second VIC plug 132 may be installed with an 'O' ring seal (not shown) that may prevent a leakage of the low-density suspended solids from the adjustable tube 128.

The apparatus 106 may further comprise a second outlet 134 positioned at a second end of the separation tube 112, in an embodiment of the present invention. In an embodiment of the present invention, the apparatus 106 may be adapted to remove the remaining water containing any remaining suspended solids through the second outlet 134 of the apparatus 106. In an embodiment of the present invention, the remaining water that may be flown through the second outlet 134 may have a third pre-defined pressure i.e. P3. In an embodiment of the present invention, the apparatus 106 may comprise a second hose adapter 136 that may be attached to the second outlet 134 of the apparatus 106 for enabling an attachment of the hose appliance (not shown) to the second outlet 134 of the apparatus 106. In such embodiment of the present invention, the hose appliance may be attached to the second outlet 134 for discharging the remaining water from the apparatus 106.

The apparatus 106 may further comprise grooved couplings 138a-138b (hereinafter referred to as the grooved couplings 138) that may be arranged at the first end and the second end of the separation tube 112, in an embodiment of the present invention. The grooved couplings 138 may be arranged to provide flexibility in movement and modification of the vortex generator 118 and the adjustable tube 128 respectively, according to embodiments of the present invention.

Figure 2:
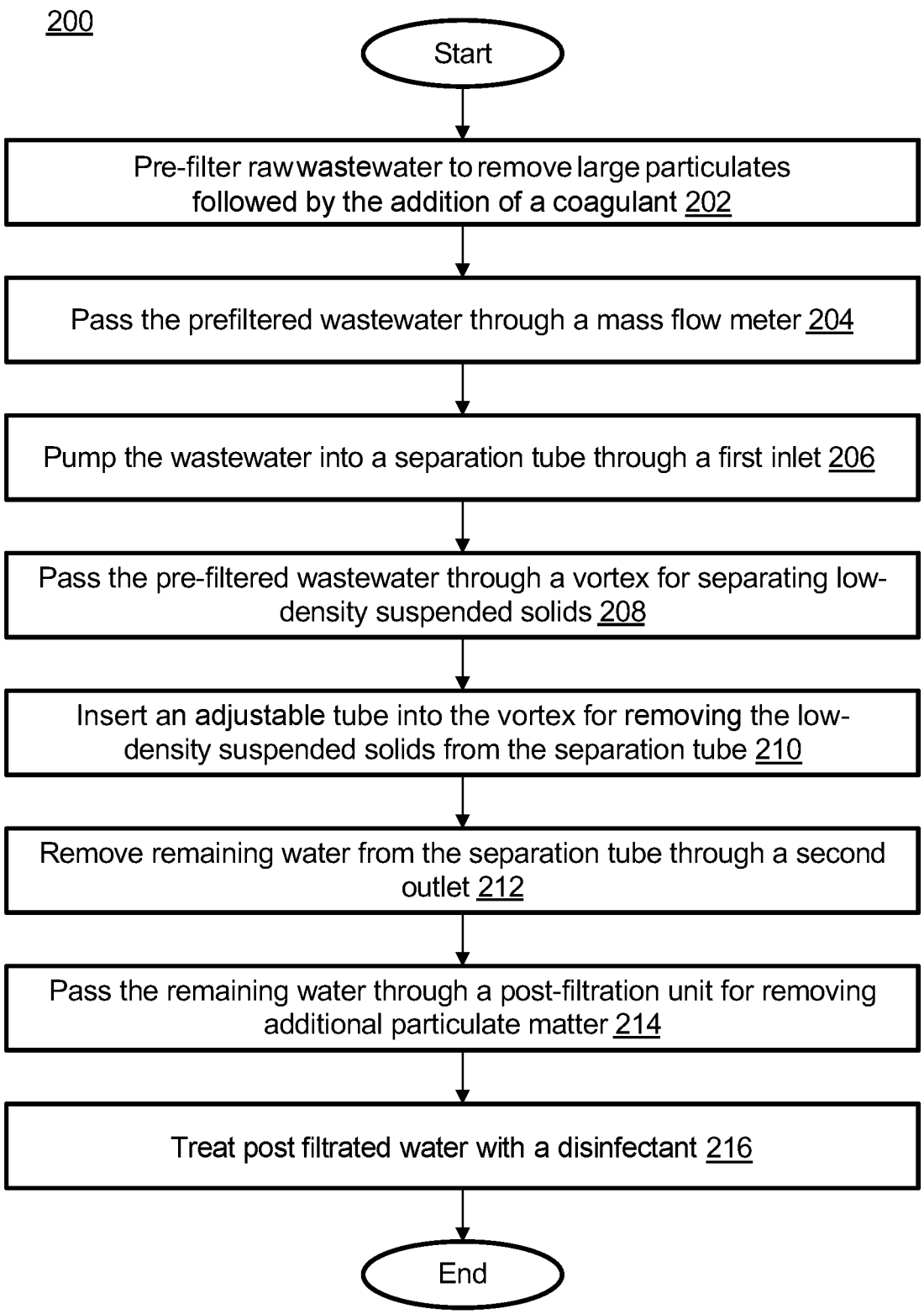
FIG. 2 illustrates a flowchart of a method for treating wastewater, according to an embodiment of the present invention.

FIG. 2 illustrates a flowchart of a method 200 for treating the wastewater, according to an embodiment of the present invention.

At step 202, the raw wastewater may be pre-filtered by the pre-filtration unit 102 to remove the large particulates followed by the addition of a coagulant, as discussed above.

At step 204, the pre-filtered wastewater may be passed through the mass flow meter 104 to determine the amount of polymers and air to be added into the pre-filtered wastewater.

At step 206, the pre-filtered wastewater may be pumped into the separation tube 112 through the first inlet 114 of the apparatus 106.

At step 208, the pre-filtered wastewater may be passed through the vortex that may be created by the vortex generator 118 inside the separation tube 112 such that the apparatus 106 enables the low-density suspended solids having a density less than one (1) to remain in the center of the vortex while passing through the vortex and pushes the remaining water to the periphery of the vortex.

At step 210, the adjustable tube 128 may be inserted with the desired length into the vortex such that the negative pressure inside the adjustable tube 128 causes the low density suspended solids comprising a mixture of particulate, air, polymer and/or coagulate to be removed from the separation tube 112.

At step 212, the remaining water may be removed from the separation tube 112 through the second outlet 134 of the apparatus 106.

At step 214, the remaining water may be passed through the post-filtration unit 108 for removing the additional particulate matter. In additional embodiments of the present invention, a second post filtration step (not shown) may be incorporated should indirect potable water be desired.

At step 216, the remaining water is disinfected through the use of a bacteriostatic and ultraviolet radiation.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

The exemplary embodiments of this present invention have been described in relation to an apparatus to separate low density suspended solids. However, to avoid unnecessarily obscuring the present invention, the preceding description omits a number of known structures and devices. This omission is not to be construed as a limitation of the scope of the present invention. Specific details are set forth by use of the embodiments to provide an understanding of the present invention. It should however be appreciated that the present invention may be practiced in a variety of ways beyond the specific embodiments set forth herein.

A number of variations and modifications of the present invention can be used. It would be possible to provide for some features of the present invention without providing others.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. It is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system for wastewater treatment comprising:
   a pre-filtration unit adapted to pre-filter raw wastewater for removing particulate from the raw wastewater;
   a mass flow meter adapted to determine an amount of polymer and air to he mixed with the pre-filtered wastewater;
   a low-density suspended solid separation apparatus, wherein the apparatus comprises:
      a separation tube having a first pre-defined pressure, and adapted to receive the pre-filtered wastewater through a first inlet positioned at a first end of the separation tube;
      a vortex generator located within the separation tube, wherein the vortex generator is rotated to create a vortex in the separation tube such that the vortex separates and captures within the vortex low-density suspended solids from the pre-filtered wastewater when the pre-filtered wastewater is passed through the vortex generator;
      an adjustable tube inserted to a desired length into the vortex from a first outlet of a second end of the separation tube, wherein the adjustable tube extends outside of the separation tube and into a center region of the vortex within the separation tube, wherein the adjustable tube has an interior region configured as a vacuum to remove the low-density suspended solids, with a second pre-defined pressure lesser than the first pre-defined pressure of the separation tube such that a negative pressure created in the adjustable tube causes the low density suspended solids to be removed from the vortex of the separation tube; and
      a second outlet positioned at the second end of the separation tube adapted to remove remaining water from the separation tube;
   a first post-filtration unit adapted to receive the remaining water from the apparatus; and
   a disinfection stage adapted for disinfection of the remaining filtered water received from the first post-filtration unit.

2. The system of claim 1, wherein one or more coagulates are added to the pre-filtered wastewater.

3. The system of claim 1, wherein the low-density suspended solids are suspended solids with a density less than one gram per cubic centimeter.

4. The system of claim 1, wherein the first post-filtration unit is an ultra-filtration membrane.

5. The system of claim 1, wherein the disinfection of the filtered water comprises a bacteriostatic and ultraviolet radiation.

6. The system of claim 1, further comprising a first hose adapter attached to the first inlet of the apparatus.

7. The system of claim 1, wherein the vortex generator is an impeller.

8. The system of claim 1, further comprising a second post filtration unit adapted to receive the remaining water from the first post filtration unit prior to disinfection.

9. The system of claim 8, wherein the second post filtration unit comprises a reverse osmosis membrane.

10. A low-density suspended solid separation apparatus comprising:
    a separation tube having a first pre-defined pressure, and adapted to receive pre-filtered wastewater through a first inlet positioned at a first end of the separation tube;
    a vortex generator located within the separation tube, wherein the vortex generator is rotated to create a vortex in the separation tube such that the vortex separates low-density suspended solids from the pre-filtered wastewater when the pre-filtered wastewater is passed through the vortex generator;
    an adjustable tube inserted to a desired length into the vortex from a first outlet of a second end of the separation tube, wherein the adjustable tube extends outside of the separation tube and into a center region of the vortex within the separation tube, wherein the adjustable tube has an interior region configured as a vacuum to remove the low-density suspended solids, with a second pre-defined pressure lesser than the first pre-defined pressure of the separation tube such that a negative pressure created in the adjustable tube causes the low density suspended solids to be removed from the separation tube; and a second outlet positioned at the second end of the separation tube adapted to remove remaining water from the separation tube.

11. The apparatus of claim 10, wherein the low-density suspended solids are suspended solids with a density less than one gram per cubic centimeter.

12. The apparatus of claim 10, wherein the separation tube is cylindrical in shape.

13. The apparatus of claim 10, further comprising a first hose adapter attached to the first inlet of the apparatus.

14. The apparatus of claim 10, wherein the vortex generator is an impeller.

15. A method for treating wastewater comprising steps of:
passing raw wastewater through a pre-filtration unit for removing one or more particulates;
adding one or more coagulates to the prefiltered wastewater;
determining, by a mass flow meter, an amount of polymer and air to be mixed with the pre-filtered wastewater;
receiving the pre-filtered wastewater by a separation tube of an apparatus through a first inlet positioned at a first end of the separation tube;
passing the pre-filtered wastewater through a vortex generator such that the vortex generator is rotated to create a vortex in the separation tube for separating low-density suspended solids from the pre-filtered wastewater;
inserting an adjustable tube into the vortex from a first outlet of a second end of the separation tube such that a negative pressure in the adjustable tube causes the low density suspended solids to be removed from the separation tube, wherein the adjustable tube extends outside of the separation tube and into a center region of the vortex within the separation tube, wherein an interior region of the adjustable tube is configured as a vacuum to remove the low density suspended solids, with a pre-defined pressure of the adjustable tube being lesser than a pre-defined pressure of the separation tube;
removing remaining water from the separation tube through a second outlet of the apparatus;
passing the remaining water through a first post-filtration unit; and
adding a disinfectant to the remaining water.

16. The method of claim 15, wherein the low-density suspended solids are suspended solids with a density less than one gram per cubic centimeter.

17. The method of claim 15, wherein the first post-filtration unit comprises an ultra-filtration membrane.

18. The method of claim 15, wherein the disinfectant comprises a bacteriostatic and ultraviolet radiation.

19. The method of claim 15, further comprising a second post-filtration unit adapted to receive the remaining water from the first post filtration unit prior to disinfection.

20. The method of claim 19, wherein the second post-filtration unit comprises a reverse osmosis membrane.

* * * * *